United States Patent [19]

Nakagama et al.

[11] Patent Number: 5,366,291
[45] Date of Patent: Nov. 22, 1994

[54] TEMPERATURE SENSING DEVICE FOR A ROTATING FIXING ROLLER

[75] Inventors: Kiyohari Nakagama; Kouichi Hanada, both of Hachioji, Japan

[73] Assignee: Konica Corporation, Tokyo, Japan

[21] Appl. No.: 200,352

[22] Filed: Feb. 22, 1994

Related U.S. Application Data

[63] Continuation of Ser. No. 929,958, Aug. 14, 1992, abandoned.

[30] Foreign Application Priority Data

| | | | |
|---|---|---|---|
| Sep. 6, 1991 | [JP] | Japan | 3-227274 |
| Dec. 2, 1991 | [JP] | Japan | 3-318026 |
| Jan. 13, 1992 | [JP] | Japan | 4-003948 |

[51] Int. Cl.$^5$ .......................... G01K 1/14; G01K 13/08
[52] U.S. Cl. ............................ 374/153; 374/208
[58] Field of Search ............................ 374/153, 208

[56] References Cited

U.S. PATENT DOCUMENTS

| | | | |
|---|---|---|---|
| 2,095,877 | 10/1937 | Junkins | 73/32 |
| 2,627,182 | 2/1953 | Quereau et al. | 374/153 |
| 4,091,673 | 5/1978 | Tamura et al. | 374/153 |
| 4,419,023 | 12/1983 | Hager, Jr. | 374/153 |
| 4,441,827 | 4/1984 | Coderre | 374/153 |
| 4,614,443 | 9/1986 | Hamert | 374/208 |
| 5,176,451 | 1/1993 | Sasada et al. | 374/208 |

FOREIGN PATENT DOCUMENTS

| | | | |
|---|---|---|---|
| 0869562 | 3/1953 | Germany | 374/253 |
| 19612 | 4/1982 | Japan . | |
| 0044633 | 3/1984 | Japan | 374/153 |
| 0219841 | 9/1986 | Japan | 374/208 |
| 63731 | 4/1988 | Japan . | |
| 21315 | 6/1989 | Japan . | |
| 51765 | 11/1989 | Japan . | |

OTHER PUBLICATIONS

Engineering, vol. 194, No. 5043, Dec 14, 1962; London, GB p. 768 "Measuring Temperatures of Fast moving Surfaces".

*Primary Examiner*—Diego F. F. Gutierrez
*Attorney, Agent, or Firm*—Jordan B. Bierman

[57] ABSTRACT

In a device for sensing a temperature of a fixing roller, a thermistor is provided on a flat upper surface of a support member made of a foamed silicone material, with a heat conductive material provided between them. A heatproof protective sheet is wrapped around so that the thermistor is partially sunk into the support member by the tightness of the wrapping. The heat conductive material is thereby deformed to the thermistor's shape. At the same time, the top part of the thermistor is always protruded from the upper part of the support member. A holder keeps this construction in contact with the circumferential surface of the fixing roller.

2 Claims, 7 Drawing Sheets

TEMPERATURE SENSING DEVICE FOR A ROTATING FIXING ROLLER

This application is a continuation of application Ser. No. 07/929,958 filed Aug. 14, 1992, now abandoned.

BACKGROUND OF THE INVENTION

The present invention relates to a temperature sensing device that is provided on a fixing device of an image forming apparatus for controlling the fixing temperature.

Temperature sensing in a fixing device is done by measuring the temperature on the circumferential surface of a fixing roller. In order for temperature sensing to be done accurately, temperature sensing devices which are in a type of direct pressure contact with the fixing roller are used.

The temperature sensing device mentioned above is one that is kept in contact with a rotating fixing roller with an optimum pressure. It is, for example, a temperature sensing device wherein a thermistor temperature sensing element is supported by a supporting member formed of an elastic substance such as foamed silicone or the like, all of which are covered by a protective sheet such as a polyimide film. This temperature sensing device is kept in pressure-contact with a circumferential surface of a fixing roller, through the protective sheet, with a load of 50–150 GMF, thereby the temperature on the roller surface is measured directly, and a heater built in the fixing roller is turned on or turned off by the measured temperature. Thus, the temperature may be controlled.

When a temperature sensing element is supported directly by a supporting member, the temperature on the side of the temperature sensing element where it is in contact with a fixing roller is the same as that on the fixing roller surface, but the temperature on the other side being in contact with the supporting member is different because heat in the temperature sensing element is lost through the supporting member. For example, a temperature difference of 30° C. to 40° C. has been created for the measured temperature of about 190° C., making it impossible to measure accurately the temperature on the fixing roller surface. When setting the fixing temperature to 190° C., the actual controlled temperature on the fixing roller surface can be 200° C.–210° C., far higher than the temperature at which the apparatus is set.

In addition to the above, the temperature difference has tended to be increased by the change of pressure-contact condition of the supporting member caused by friction and vibration caused by on the rotation of the fixing roller.

As one means to overcome the temperature difference, there has been proposed a method wherein a thin metal sheet having a high thermal conductivity such as an aluminum foil is inserted between a temperature sensing element and a supporting member to take advantage of the heat-transfer thereby it is possible to measure and control accurately the temperature on the fixing roller surface.

With regard to the method mentioned above, there has been proposed methods in Japanese Utility Model Examined Publication No. 21315/1989 and Japanese Patent Examined Publication No. 51765/1989. In both cases, however, due to the structure wherein a temperature sensing element is embedded in a cutout and recess having a certain depth provided in advance on a supporting member, the top surface of the temperature sensing element does not always protruded above the supporting member because of the variation of the depth of the cutout and recess of the embedded position, resulting in occasional inability of accurate measurement of temperature on the fixing roller surface, despite transfer the thin metal sheet.

The method suggested in Japanese Utility Model Publication Open to Public Inspection No. 63731/1988, likewise, is not common because it is expensive due to a specific thermistor used therein.

The method suggested in Japanese Utility Model Examined Publication No. 19612/1982 is one wherein a temperature sensing element is attached on a flexible thin layer to be in close-contact therewith and the thin layer is provided with a superficial layer having a lower coefficient of friction. The method, however, is not satisfactory on the point of thermal responding properties.

SUMMARY OF THE INVENTION

An object of the invention is to provide a temperature sensing device capable of coming in pressure-contact with a fixing roller constantly without being influenced by the accuracy of processing and assembling thereof and capable of measuring temperature on the surface of the fixing roller accurately.

In the first constitution of a fixing device with a temperature sensing device for achieving the object mentioned above, the above-mentioned temperature sensing device comprises a temperature sensing element, a supporting member made of elastic material and a heat-conductive thin metal sheet which is inserted between the temperature sensing element and the supporting member, so that a part thereof protrudes around the back of the temperature sensing element, in a device for sensing temperature on a fixing roller of a fixing device that heats and fixes a toner image on an image-transfer material.

In such a device, when the temperature sensing device mentioned above is in pressure-contact with the fixing roller, the top of the temperature sensing element is kept in contact with the circumferential surface of the fixing roller through a protective sheet, while the bottom of the temperature sensing element is partially buried in the supporting member.

With regard to a second embodiment of a fixing device with a temperature sensing device, in a fixing device with a temperature sensing device comprising a temperature sensing element, a supporting member which is made of elastic material and supports the temperature sensing element and a protective sheet that covers the temperature sensing element and the supporting member, heat-conductive materials are coated on the supporting member including a portion where the supporting member is in contact with the temperature sensing element.

With regard to a third embodiment, in a fixing device with a temperature sensing element comprising a supporting member which is made of elastic material and supports the temperature sensing element and a protective sheet that covers the temperature sensing element and the supporting member, the supporting member is of a two-layer composition consisting of a heat-conductive elastic member and an adiabatic elastic member, and the temperature sensing element is held by the heat-conductive elastic member mentioned above.

With regard to the fourth embodiment, in a fixing device with a temperature sensing device comprising a temperature sensing element, a supporting member which is made of elastic material and supports the temperature sensing element, and a protective sheet that covers the temperature sensing element and the supporting member, the above-mentioned supporting member is kept in pressure-contact with the circumferential surface of the fixing roller at two points of the supporting member which are positioned at an upstream side and a downstream side in the direction of rotation of the fixing roller.

In a fifth embodiment of a fixing device with a temperature sensing device, it comprises a temperature sensing element, a supporting member which is made of elastic material and supports the temperature sensing element, and a protective sheet that covers the temperature sensing element and the supporting member, and the surface of a heat-sensing area of the temperature sensing element is formed to be a layer having high thermal conductivity.

In a sixth embodiment of a fixing device with a temperature sensing device, it comprises a temperature sensing element, a supporting member which is made of elastic material and supports the temperature sensing element, and a protective sheet that covers the temperature sensing element and the supporting member, and a sheet having high thermal conductivity is inserted respectively between the supporting member and the temperature sensing element and between the temperature sensing element and the protective sheet.

BRIEF DESCRIPTION OF THE DRAWINGS

FIG. 6 is a sectional view showing a fourth example of a temperature sensing device of the invention.

DETAILED DESCRIPTION OF THE PREFERRED EMBODIMENT

Figure 1:
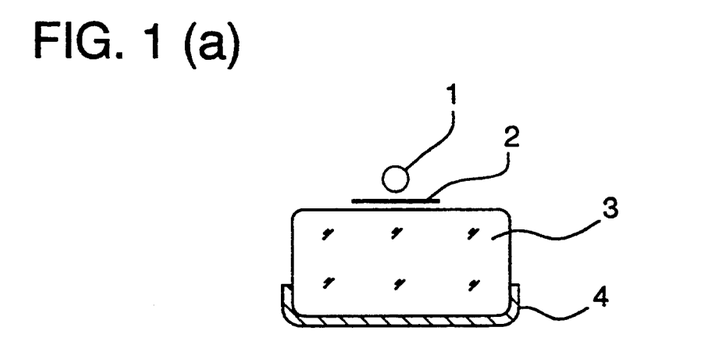
FIGS. 1(a), 1(b) and 1(c) are sectional views showing a first example of a temperature sensing device of the invention.
Figure 3:
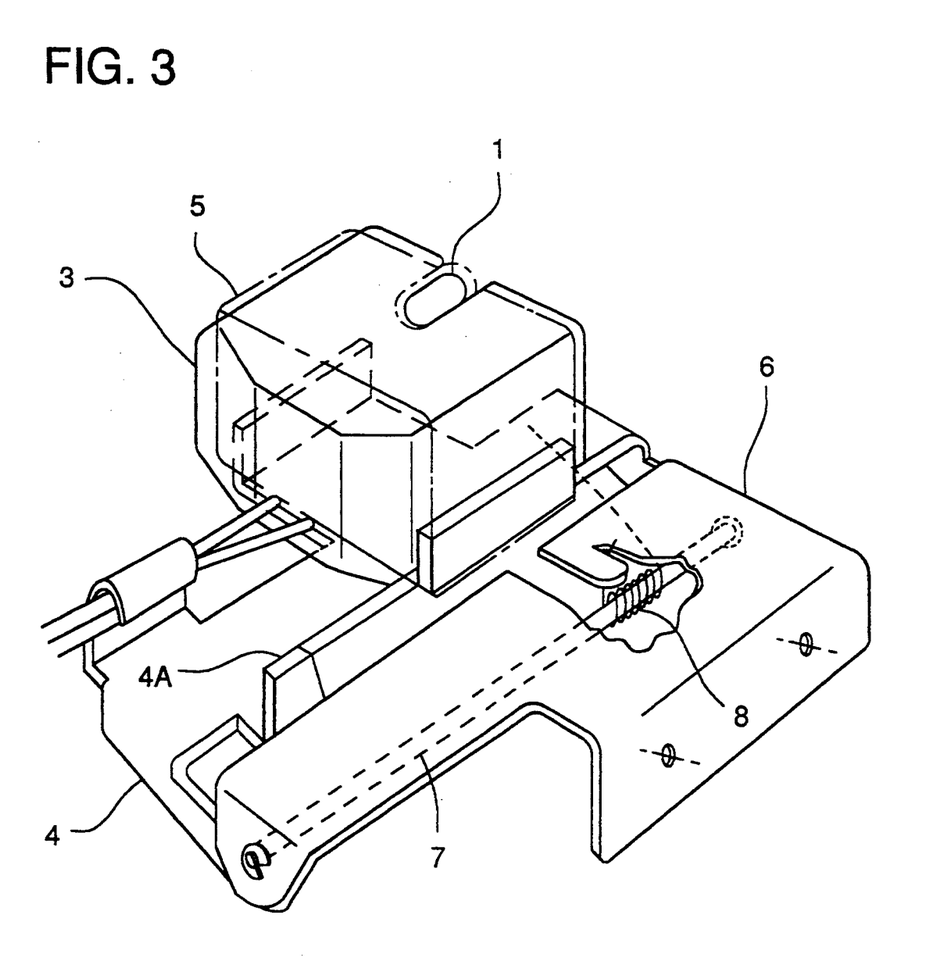
FIG. 3 is a perspective view showing how the above-mentioned temperature sensing device is mounted.

The first example of invention will be shown in FIGS. 1(a)–1(c) and in FIG. 3.

The basic constitution of a temperature sensing device of the invention is shown in FIG. 1(a) wherein numeral 1 represents a thermistor temperature sensing element, numeral 2 represents a flat and thin metal sheet that is heat-conductive, 3 is an elastic supporting member whose top is flat and 4 is a metallic holder that holds supporting member 3.

Thin metal sheets having a heat conductivity of $\lambda = 100$ W/m° C. or more are acceptable as thin metal sheet 2, and aluminum foil, copper foil, berylium foil, and magnesium foil are preferable; the thickness of an aluminum foil to be used is 20–30 $\mu$m.

For supporting member 3, foamed silicone which has a broad elastic area and high thermal resistance is used.

Both thermistor 1 and the supporting member 3 having thin metal sheet 2 between them as shown in the figure and metallic holder 4 are wrapped with heat-resisting protective sheet 5 such as a polyimide film. As shown in FIG. 1(b) and FIG. 1(c) showing a sectional view taken on arrowed line A—A in FIG. 1(b), therefore, thermistor 1 is caused by the tension based on wrapping of the protective sheet 5 to be buried partly in supporting member 3, forming a hemispherical concave surface on top face of the supporting member 3.

Due to the foregoing, part of thin metal sheet 2, in a foil shape, is transformed automatically into a hemispherical shape following the shape of the thermistor 1, and other parts of the thin metal sheet remain at the top surface and come in contact, through protective sheet 5 with fixing roller 10 under a pressure-contact condition.

Further, since thermistor 1 is held so that a part thereof protrudes from the top surface of supporting member 3 by the elasticity of supporting member 3, thermistor 1 can be kept in pressure-contact with the surface of fixing roller 10, through protective sheet 5 maintaining firm contact despite dispersion of thermistor 1 itself and erroneous positioning thereof.

Figure 2:
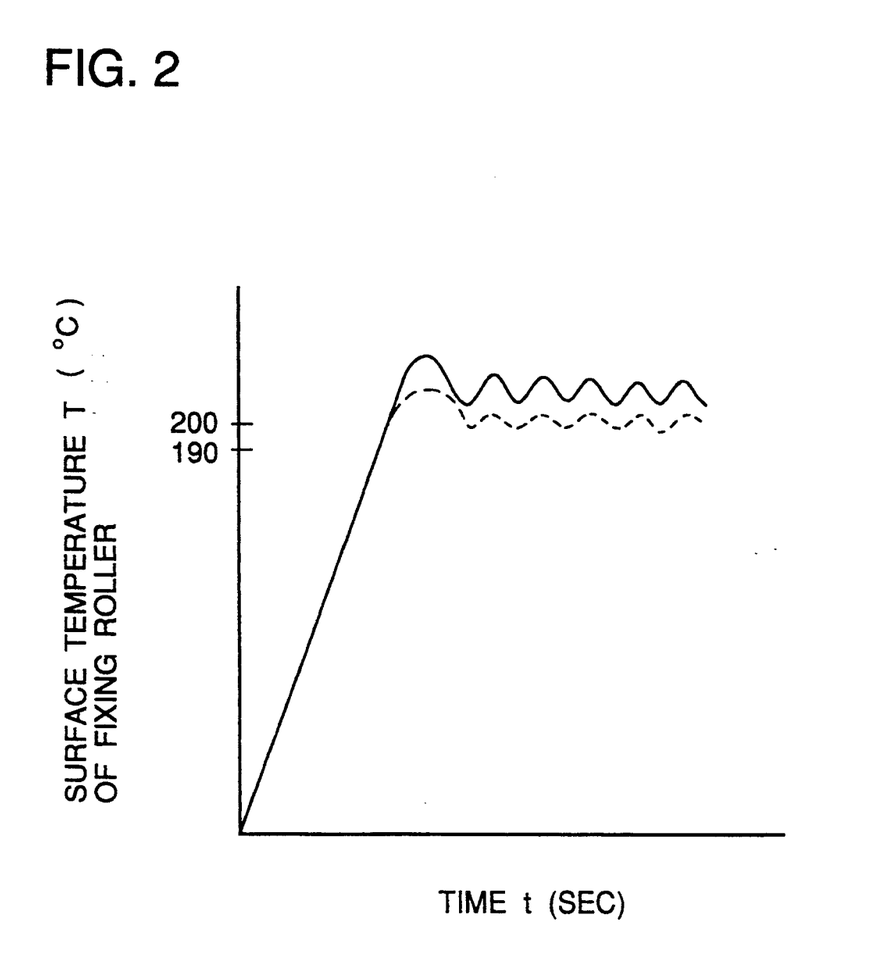
FIG. 2 is a graph showing the results of measurement conducted by the above-mentioned temperature sensing device.

In FIG. 2, results of experiments show the relation between temperatures (shown with solid lines) on the surface of a fixing roller controlled by a conventional temperature sensing device wherein no thin metal sheet or no heat-conductive coated layer 102 shown in the second example described later is used or no sheet-shaped cover 202 is used for wrapping the temperature sensing device and temperatures (shown with broken lines) controlled by the temperature sensing device of the invention. According to the results of experiments, when the temperature was controlled by the former temperature sensing device for the temperature on a fixing roller set to 190° C.±5° C., the temperature on the surface of an experimental roller was 230° C.–240° C. for overshooting and 200° C.–210° C. for the controlled temperature, showing the controlled temperature exceeding by far the set temperature, while when the temperature was controlled by the latter, the temperature was 200° C.±5° C. for overshooting and 194° C.±5° C. for the controlled temperature, showing the controlled temperature extremely close to the above-mentioned set temperature.

The temperature sensing device of the invention may be attached rotatably by connecting metallic holder 4 to bracket 6 fixed in fixing device through a through type shaft 7. The metallic holder 4 supported on bracket 6 is urged clockwise by torsion spring 8 with a fulcrum of through type shaft 7 so that it may bring thermistor 1 in pressure-contact with the surface of fixing roller 10.

The urging force of torsion spring 8 is adjusted so that the load for pressure-contact of thermistor 1 on fixing roller 10 may be within a range of 50 gf to 100 gf. When fixing roller 10 is removed on the occasion such as a maintenance, stopper 4A united with metallic holder 4 hits bracket 6 to avoid rotation of the temperature sensing device exceeding the necessary amount.

Other examples of the invention will be explained as follows, referring to FIGS. 4(a)–4(d), FIGS. 5(a)–5(d) and FIG. 6.

FIGS. 4(a) through 4(d) show basic embodiments of a second example of a temperature sensing device, and numeral 1 represents a thermistor temperature sensing element, 3 represents an elastic supporting member, 102 represents a coated layer of heat-conductive material coated on the portion where thermistor 1 is in contact with supporting men, her 3, and 4 represents a metallic holder that holds supporting member 3.

Figure 4:
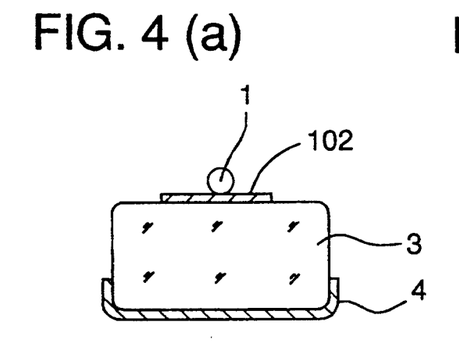
FIGS. 4(a), 4(b), 4(c) and 4(d) are sectional views showing a second example of a temperature sensing device of the invention, FIGS. 5(a), (b), (c) and (d) are sectional views showing a third example of a temperature sensing device of the invention.

For supporting member 3, foamed silicone material having a broad elastic area and high thermal resistance is used, and as the heat-conductive material, on the other hand, Dotite (trade name) is appropriate, and is coated to be a thin layer as shown in FIG. 4(a), or is coated in a layer shape on supporting member 3 including the portion where temperature sensing element 1 is in partial contact with supporting member 3 as shown in FIG. 4(b).

Both thermistor 1 and supporting member 3 having heat-conductive coated layer 102 between them as shown in the figure and the metallic holder 4 are wrapped with heat-resisting protective sheet 5 such as a polyimide film. As shown in FIG. 4(c) and FIG. 4(d) showing a sectional view taken on arrowed line A—A in FIG. 1(b), therefore, the thermistor 1 is caused by the tension based on wrapping by protective sheet 5 to be buried partly in supporting member 3, forming a hemispherical concave surface on the top face of supporting member 3.

Due to the foregoing, part of the heat-conductive coated layer 102 is transformed automatically into a hemispherical shape following the shape of thermistor 1 when positioned behind the thermistor, and other parts of the thin metal sheet remain at the top surface and come in contact with the fixing roller 10, through protective sheet 5, under the pressure-contact condition.

Further, since thermistor 1 is held so that a part thereof protrudes from the top surface of supporting member 3 by reaction force caused by elasticity of supporting member 3, thermistor 1 can be kept in pressure-contact, through protective sheet 5 with the surface of fixing roller 10 maintaining the firm contact condition despite dispersion of thermistor 1 itself and erroneous positioning thereof.

FIGS. 5(a)–5(d) show a third example of a temperature sensing device wherein supporting member 12 that supports thermistor 1 is of a two-layer composition including elastic member 12A and elastic member 12B both of which are cemented to be one unit.

Figure 5:
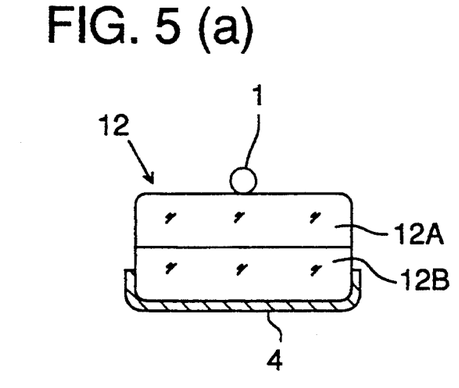

For elastic member 12A which is in contact with thermistor 1, foamed material having a high thermal conductivity is used, and for the elastic member 12B, on the other hand, foamed material being highly adiabatic is used, and they are united into one in a flat layer form as shown in FIG. 5(a) or in an embedded type as shown in FIG. 5(b).

Even in the present example, therefore, when being brought into contact with the surface of fixing roller 10, through protective layer 5, thermistor 1 is embedded in the elastic member 12A as shown in FIG. 5(c) and FIG. 5(d) showing a sectional view taken on arrowed line BB in FIG. 5(c).

FIG. 6 shows a fourth example of a temperature sensing device wherein metallic holder 14 holding supporting member 12 has recessed portion 14A at the central part on the bottom of the metallic holder, and a slight clearance is formed between recessed portion and the bottom of supporting member 12.

Due to the foregoing, when metallic holder 14 is urged clockwise by the action of torsion spring 8 and thereby the supporting member 12 is brought into pressure-contact with the circumferential surface of the fixing roller 10, through protective layer 5, an upstream side and downstream side of supporting member 12 in the direction of rotation of the fixing roller, namely edge portions at right and left sides of the supporting member 12 are brought into pressure-contact strongly, while thermistor 1 is brought into pressure-contact moderately owing to the elasticity of the supporting member 12. Therefore, a stable temperature sensing attitude can be maintained constantly without any change thereof and without any generation of vibrations even when friction resistance caused by sliding of the fixing roller 10 is applied thereon.

Still other examples of the invention will be explained as follows, referring to FIGS. 7(a)–7(c) and FIGS. 8(a)–8(c).

Figure 7:
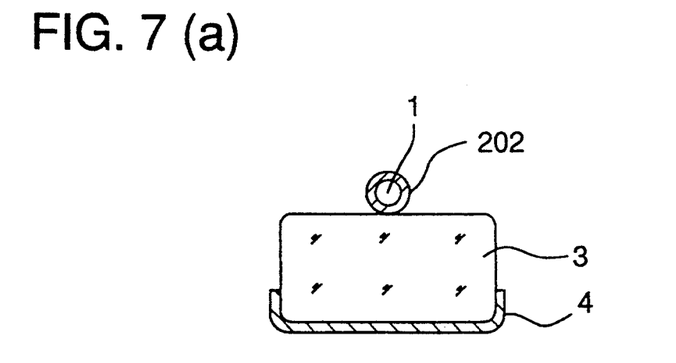
FIGS. 7(a), 7(b) and 7(c) are sectional views showing a fifth example of a temperature sensing device of the invention.

FIGS. 7(a)–7(c) show a basic embodiment of the fifth examples of a temperature sensing device wherein numeral 1 represents a thermistor temperature sensing element, numeral 3 is an elastic supporting men, her, 202 represents a highly heat-conductive film-shaped sheet that covers the surface of thermistor 1, and 4 is a metallic holder that holds supporting member 3.

For the supporting member 3 mentioned above, foamed silicone material that has a broad elastic area and is highly heat-resisting is used, and one side of supporting member 3 is provided with thermistor 1 and film-shaped sheet 202 which is highly heat-conductive is formed on the surface of a temperature-sensing portion of an thermistor 1 through the evaporating means or the like to cover the thermistor. Incidentally, the film-shaped sheet 202 may also be formed through means such as glueing, spattering or coating. As is shown in FIG. 7(a), both thermistor 1 and supporting member 3 covered by highly heat-conductive film-shaped sheet 202 are wrapped with heat-resisting protective sheet 5 such as a polyimide film together with metallic holder 4. A lead wire of thermistor 1 is welded with an electric cable through means such as welding in supporting member 3 and electric cable is led out of supporting member 3. As shown in FIG. 7(b) and FIG. 7(c) that shows a sectional view taken on arrowed line AA in FIG. 7(b), therefore, thermistor 1 is caused by tension based on wrapping protective sheet 5 to be buried partly in the supporting member 3, forming a hemispherical concave surface on the top face of supporting member 3.

As a result of the above construction, when thermistor 1 is in contact with fixing roller 10, a temperature sensing portion of thermistor 1 is totally reads the temperature of fixing roller 10 that is an item to be measured, thereby it is possible to enhance the temperature sensing ability and heat responding ability fixing roller 10.

Further, since thermistor 1 is held so that a part thereof protrudes from the top surface of the supporting member 3 by reaction force caused by elasticity of the supporting member 3, thermistor 1 can be kept in pressure-contact, through protective layer 5, with the surface of fixing roller 10 maintaining the firm contact condition despite dispersion of thermistor 1 itself and erroneous positioning thereof.

Figure 8:
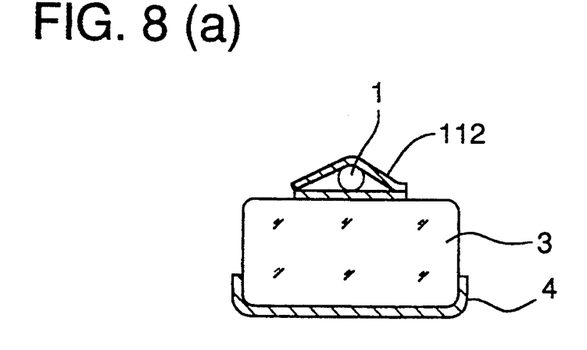
FIGS. 8(a), 8(b) and 8(c) are sectional views showing a sixth example of a temperature sensing device of the invention.

FIGS. 8(a)–8(c) show a sixth examples of a temperature sensing device wherein thermistor 1 is sandwiched vertically between two equally-shaped highly heat-conductive sheets 112 and is placed on supporting member 3 held by metallic holder 4 to be wrapped with protective sheet 5 so that they may be united solidly. With regard to thermistor 1, supporting member 3, metallic holder 4 and protective sheet 5, those having the same specific characteristics as in the fifth example may be used. As heat-conductive sheet 112 having high thermal conductivity, a metal foil such as aluminum foil is preferably used.

FIG. 8(a) shows how thermistor 1 sandwiched by heat-conductive sheets 112 is placed on supporting member 3, FIG. 8(b) shows how a portion of thermistor 1 wrapped with protective sheet 5 which protrudes in a shape of a semicircle is brought into contact with the circumferential surface of fixing roller 10, and FIG. 8(c) shows a sectional view taken on arrowed line BB in FIG. 8(b). In present example, again, the thermistor 1 is in the state that it is sandwiched by heat-conductive sheets 112 which represent a heat-absorbing member and thereby, both the top surface and the bottom surface of the thermistor 1 are mostly at the same temperature as the circumferential surface of the fixing roller 10. Therefore, it has been confirmed that temperature sensing with a small temperature gradient for thermistor 1 and an excellent responding ability can be conducted.

In example mentioned above, the thermistor 1 is sandwiched between two heat-conductive sheets 112. However, thermistor 1 may be inserted in twice-folded heat-conductive sheet 112 or may be put in bag-shaped heat-conductive sheet 112 and placed on the supporting member 3. This may contribute to easy assembling work.

Owing to the present invention, it has become possible to provide a fixing device with a temperature sensing device that is suitable for mass production because of its merits of easy processing and mounting thereof and is capable of measuring and controlling the fixing temperature accurately with its advantages of firm contact with a fixing roller.

What is claimed is:

1. A temperature sensing device for sensing a temperature of a fixing roller in a fixing device for fixing a toner image on a recording material, with heat, said temperature sensing device comprising;
   (a) a temperature sensing element;
   (b) a resilient support member having a continuous, flat uppermost surface on which said element is supported;
   (c) a thin metal plate provided between said element and said support member, a portion of said plate protruding from an outer surface of said element along said uppermost surface; and
   (d) a protective sheet by which at least said element, said plate, and said member are integrally wound, said protective sheet holding said temperature sensing element against said resilient support member so that said sensing element partly sinks into said support member, wherein, when said sensing device is placed in pressing contact with said roller, one side of said element is urged to sink further into said support member while an opposite side of said element is kept in contact with said roller through said protective sheet.

2. The temperature sensing device of claim 1 wherein said support member is formed of foamed silicone, and said plate is formed of a foil selected from the group consisting of aluminum foil, copper foil, beryllium foil, and magnesium foil, and wherein said sensing element and said portion of said plate protruding from an outer surface of said element are maintained in pressing contact with said fixing roller, through said protective sheet.

* * * * *